UNITED STATES PATENT OFFICE.

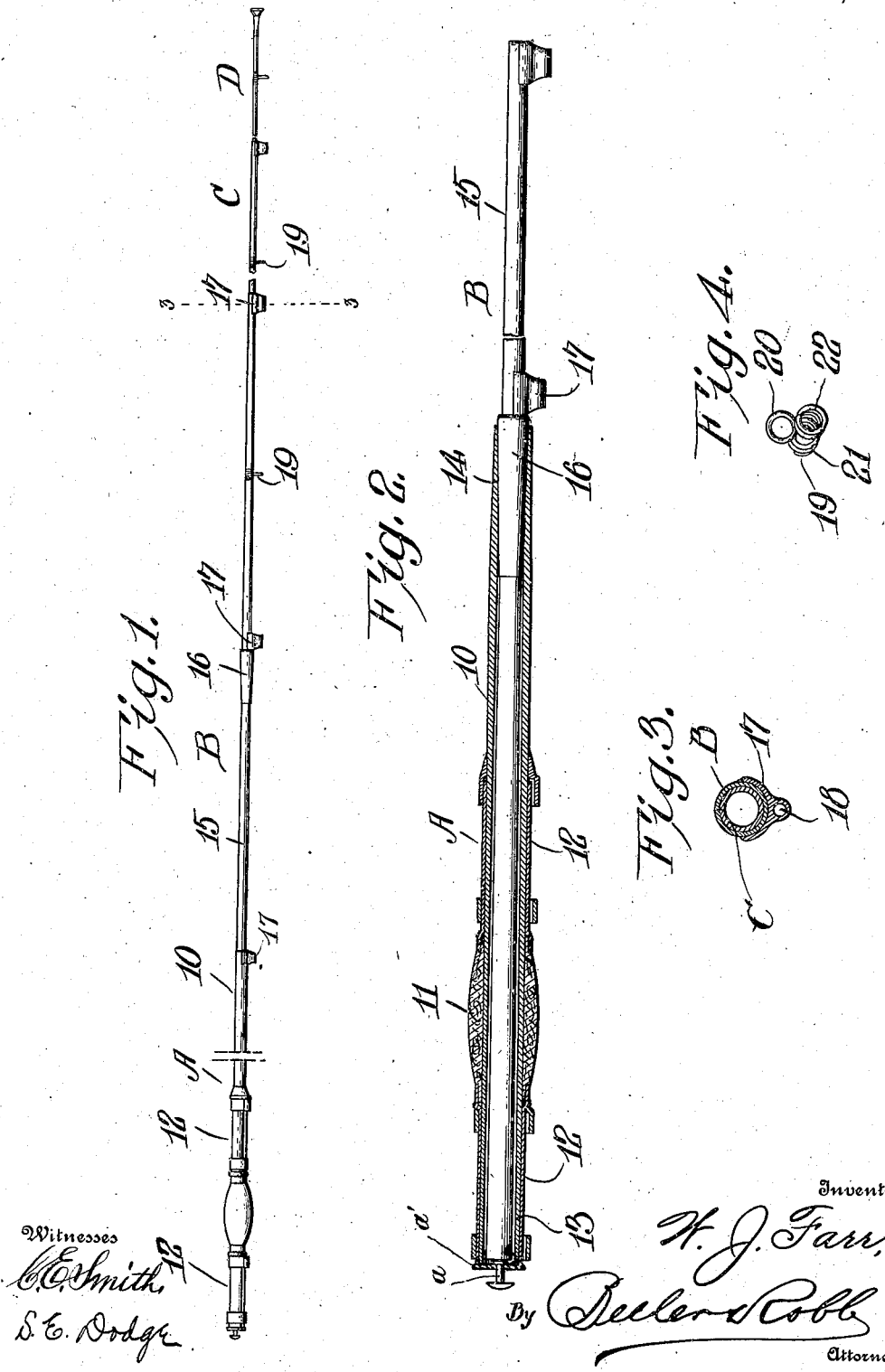

WILLIAM J. FARR, OF MUSKEGON, MICHIGAN.

FISHING-ROD.

No. 911,119.

Specification of Letters Patent.

Patented Feb. 2, 1909.

Application filed May 28, 1908. Serial No. 435,526.

*To all whom it may concern:*

Be it known that I, WILLIAM J. FARR, a citizen of the United States, residing at Muskegon, in the county of Muskegon and State of Michigan, have invented certain new and useful Improvements in Fishing - Rods, of which the following is a specification.

This invention relates to fishing rods of the collapsible type, and has particular reference to rods of this character which are constructed preferably of metal tubing, the sections of which are telescopic.

The construction of this present invention is such that the pole may be adapted to different lengths when in position for use, and also which is adapted to be collapsed to a short length for storage or transportation purposes.

For a full understanding of the invention, including its construction and characteristic advantages, reference is to be had to the following detail description and to the accompanying drawings, in which—

Figure 1 is a view of a fishing rod constructed in accordance with this invention, showing the principal parts as in maximum extension; Fig. 2 is an enlarged view of the first two sections of the rod, the handle section being in section; Fig. 3 is a cross sectional detail on the line 3—3 of Fig. 1, and Fig. 4 is a detail perspective of a slidable line guide to be hereinafter described.

Throughout the following detail description and on the several figures of the drawings, similar parts are referred to by like reference characters.

The herein described fishing rod comprises a plurality of coöperating parts or sections. The handle section A is composed of a tubular member 10 of peculiar interior construction. Near the inner or lower end of said section is provided a handle or grip 11, as is customary. Arranged adjacent to said grip either above or below the same, or above and below, is a reel seat 12, whereby a line reel may be secured to the handle section either above or below the grip as may be preferred by the user. The inner surface of the tube 10 is tapered in two directions, in other words, the inner surface is composed of two frusto-conical parts 13 and 14, the conical part 14 being adjacent to the outer end of said tubular member. The section B likewise is of peculiar construction, and comprises a main tubular part 15, the inner end of which is located within the section A. The tube 15 is tapered slightly from one end to the other, being smaller, as is customary in this class of devices, at its outer end. The inner end of said section B, when the latter is drawn outward as far as possible, will coöperate with the tapered surface 13 of the first section, in which position the member B will be spaced for the purpose of making a pole of the maximum length. Located intermediate of the ends of said section B and rigidly secured to the tube 15 is a reversely tapered collar 16, which when the pole is collapsed will coöperate with the aforesaid surface 14. It is to be understood that the several tapers mentioned in this description are of a very slight angle, whereby by the application of friction the several parts will be securely held in adjusted position. The position of the member B with the collar 16 in coöperation with the surface 14 will be the one occupied thereby either when the entire rod is collapsed or when the rod is used as a rod of medium length.

Any suitable number of auxiliary sections coöperate each to each, the next one of such sections coöperating with the section B. Each of these auxiliary sections is tapered throughout its length and coöperates with the next preceding section in a manner somewhat similar to that in which the inner end of the section B coöperates with the section A. I have shown herein two of such auxiliary sections C and D, although it is to be understood that such number may be greater or less if desired. The section C telescopes within the section B when collapsed and coöperates with its outer end when extended. Likewise the next section telescopes within the section C when collapsed and with its outer end when extended. Each of the sections being tapered and the several sections being smaller in diameter toward the outer end of the rod, the entire structure will be tapered throughout.

At the outer end of each section is secured a line guide of the form indicated in Fig. 3, although it is to be understood that such guide may be of some other specific form if desired. As herein indicated such guide comprises a saddle 17 which embraces the outer end of the section and to which it is secured permanently as by brazing or sweating. Each of such guides is provided with a longitudinal hole 18, through which the line will be passed. The section B furthermore is provided with a similar line guide fixed thereto adjacent to the aforesaid tapered collar 16, such guide being essential when the pole is used in its extended position. The guide 17 for each of the auxiliary sections constitutes a means to prevent such section from entering too far into the next preceding section. In other words said guide constitutes a stop limiting inward movement of its section. Said line guides will of course be located on the lower side of the pole, and I have found in practice that such guides should be positioned on that side of the tubing opposite to the seam, whereby the seam, if there is one, will preferably be on the upper side of the pole. By this arrangement the strength of the pole is materially increased.

While it is not always essential, yet in some instances I have found it desirable, especially when rod sections of great length are employed, to employ one or more movable line guides on each of the movable rod sections. As a convenient and very efficient form of such movable guide I have indicated, in Fig. 4, a device 19 constructed preferably of spring wire, bent in the form of a double spiral. The intermediate portion of the metal forming such guide will be bent into an eye 20 and from which the respective ends of the metal will be reversely coiled forming separate coils 21 and 22, which embrace the rod on opposite sides of the eye. It will be understood that such guides can be made tapered upon their interior to correspond with the form of the rod sections, and the size thereof will depend upon the rod where they are intended to be used. If more than one of such movable guides be employed on a single rod section, they will preferably be of different sizes so that they will be spaced when in use. By the peculiar construction of such guide tension applied thereto by the line will cause the same to grip the rod with great firmness.

It will be understood that slight modifications or variations in construction may be resorted to without departing from the spirit of the invention hereinafter claimed, and also that the device may be made of any suitable size or dimensions and of any suitable material.

While I have illustrated in the drawings a fishing rod composed of a series of telescopic sections, it is to be understood that certain features of the invention are equally adapted for use in connection with a fishing rod in which there are no more than two relatively movable sections. That is to say, there may be provided the section A and in coöperation therewith there may be a rigid section having the characteristics shown in connection with section B, viz., the inversely tapered portions to coöperate with the corresponding tapered portions of the interior surface of the handle section. By this construction I provide, as above described, a fishing rod having a maximum length or one of medium length.

In devices of this character it is not uncommon for the section B to be jammed or locked in its telescopic position within the section A, making it difficult to extend them. To overcome this objection I provide a small plunger $a$ through the removable cap $a'$, and having at each end a head holding it in place in the cap. By applying pressure to said plunger its inner head will impinge against the inner or lower end of the section B causing it to start outwardly. This feature may be employed in either construction of the fishing rod above described.

Having thus described the invention, what is claimed as new, is:

1. A fishing rod comprising, in combination, a plurality of telescopic sections, the first of said sections being the handle section and the second section being longer than the first with one end coöperating with the said handle section, means to secure said sections in either of two relative positions so as to provide a rod either of maximum or of medium length, and a line guide fixed substantially midway of the ends of said second section.

2. The hereindescribed fishing rod comprising a handle section having reversely tapered inner surfaces and a section having corresponding inversely tapered conical sections within the aforesaid section, the several tapers of the second section being adapted to coöperate respectively with the several tapers of the first section so as to provide a rod either of maximum length or one of medium length.

In testimony whereof I affix my signature in presence of two witnesses.

WILLIAM J. FARR.

Witnesses:
BENJ. H. TELLMAN,
JULIUS BROOKER.